United States Patent [19]
Barlow et al.

[11] Patent Number: 5,241,629
[45] Date of Patent: Aug. 31, 1993

[54] METHOD AND APPARATUS FOR A HIGH PERFORMANCE ROUND ROBIN DISTRIBUTED BUS PRIORITY NETWORK

[75] Inventors: George J. Barlow, Tewksbury; Donald L. Smith, Bedford, both of Mass.

[73] Assignee: Bull HN Information Systems Inc., Billerica, Mass.

[21] Appl. No.: 593,407

[22] Filed: Oct. 5, 1990

[51] Int. Cl.$^5$ .............................................. G06F 13/37
[52] U.S. Cl. .................................. 395/325; 395/550;
395/725; 364/229.2; 364/240.1; 364/240.4;
364/240.5; 364/242.7; 364/242.92; 364/271.7;
364/DIG. 1
[58] Field of Search ............ 395/325, 550, 725;
364/DIG. 1, DIG. 2

[56] References Cited

U.S. PATENT DOCUMENTS

| | | | |
|---|---|---|---|
| 3,832,692 | 8/1974 | Henzel et al. | 395/325 |
| 3,993,981 | 11/1976 | Cassarino, Jr. et al. | 395/325 |
| 4,001,790 | 1/1977 | Barlow | 395/325 |
| 4,030,075 | 6/1977 | Barlow | 395/325 |
| 4,096,569 | 6/1978 | Barlow | 395/325 |
| 4,559,595 | 12/1985 | Boudreau et al. | 395/325 |
| 4,611,274 | 9/1986 | Machino et al. | 395/200 |
| 4,724,519 | 2/1988 | Barlow et al. | 395/325 |
| 4,748,560 | 5/1988 | Kataoka | 395/325 |
| 4,901,226 | 2/1990 | Barlow | 395/325 |
| 5,072,363 | 12/1991 | Gallagher | 395/725 |
| 5,088,024 | 2/1992 | Vernon et al. | 395/725 |
| 5,150,466 | 9/1992 | Barlow et al. | 395/325 |
| 5,151,994 | 9/1992 | Wille et al. | 395/800 |
| 5,168,564 | 12/1992 | Barlow et al. | 395/575 |

OTHER PUBLICATIONS

Jendro, J., "Extending the Megabus," *Mini-Micro Systems*, pp. 235–236, 238, 240 (Sep. 1983).

*Primary Examiner*—Thomas C. Lee
*Assistant Examiner*—Matthew C. Fagan
*Attorney, Agent, or Firm*—Faith F. Driscoll; John S. Solakian

[57] ABSTRACT

A multiprocessor system includes a plurality of identical central subsystem (CSS) units, a plurality of memory subsystem units and input/output units which connect in common to a system bus. Requests are transferred between a pair of units on a priority basis defined by a distributed bus priority network included as part of the system bus. Each CSS unit includes cycle stealer logic circuits which grant bus cycles on a round robin basis. The cycle stealer logic circuits are connected to receive high priority request signals from the network and refuse acceptance of a cycle granted to such CSS unit as a low priority requester thereby passing it along to a next lower priority CSS unit.

5 Claims, 4 Drawing Sheets

METHOD AND APPARATUS FOR A HIGH PERFORMANCE ROUND ROBIN DISTRIBUTED BUS PRIORITY NETWORK

RELATED PATENT APPLICATIONS

1. The patent application of George J. Barlow and Donald L. Smith entitled, "Flexible Distributed Bus Priority Network," filed on Oct. 5, 1990, bearing Ser. No. 07/593,436, and which issued as U.S. Pat. No. 5,150,466 on Sep. 22, 1992 which is assigned to the same assignee of this patent application.

2. The patent application of George J. Barlow and Donald L. Smith entitled, "A Minimum Contention Processor and System Bus System," filed on Oct. 5, 1990, bearing Ser. No. 07/593,437, now pending which is assigned to the same assignee as this patent application.

3. The patent application of George J. Barlow and Donald L. Smith entitled, "Cancel Mechanism for Resilient Resource Management and Control," filed on Oct. 5, 1990, bearing Ser. No. 07/593,516, and which issued as U.S. Pat. No. 5,168,564 on Dec. 1, 1992 which is assigned the same assignee as this patent application.

BACKGROUND OF THE INVENTION

1. Field of Use

This invention pertains to data processing systems and more particularly to distributed bus priority systems.

2. Prior Art

In prior art systems, the subsystem units which connect to a distributed bus priority system, each include bus logic request circuits which control access to a system bus on a priority basis as a function of the unit's positional priority relative to one en of the system bus. Certain input/output subsystem units have been given higher positional priority than other types of input/output subsystem units. However, these I/O units are connected to make low priority requests while the other types of I/O units are connected to make high priority requests. Since the higher priority positioned I/O units are allowed to request as many bus cycles as needed, it was deemed necessary to include logic circuits within the higher priority positioned I/O units for enabling the preemption of bus cycles for carrying out higher priority requests.

However, in such prior art systems, the central subsystem (CSS) units include logic circuits which enable them to be the lowest priority and are able to gain access to the system bus on a cycle stealing basis when it is idle. This type of system is disclosed in U.S. Pat. No. 4,724,519.

The arrangement enables the CSS units to access the system bus in a round robin fashion for processing simultaneous CSS requests That is, each CSS unit is in turn granted a single system bus cycle until all simultaneous CSS requesters have been granted bus access.

The major disadvantages of the above arrangement is that a high priority request could be delayed for several cycles. This could impair overall system performance, in addition to increasing the possibility of system bus saturation. Moreover, when the need arises to expand the number of CSS units which have separate interfaces to the system bus, this adds further cycle delays and increases the likelihood of bus saturation.

Accordingly, it is a primary object of the present invention to provide an improved bus access system.

It is a further object of the present invention to provide an improved bus access system for use by several CSS units which operates in a manner to reduce the likeness of bus saturation.

SUMMARY OF THE INVENTION

The above objects and other objects of the present invention are achieved in a preferred embodiment of a multiprocessor system which incorporates the principles of the present invention. The multiprocessor system includes a plurality of units, including a number of identical central subsystem (CSS) units, which are coupled to communicate requests including data, commands and address signals between units over a bus system on a priority basis defined by a distributed or skewed priority network (prinet) In the preferred embodiment, the skewed priority network is arranged as shown in U.S. Pat. No. 4,096,569 and in the article titled, "Extending the Megabus," by Jim Jendro, published in the September, 1983 issue of the publication Mini-Micro Systems.

Each identical CSS unit has a common interface unit (BIU) which includes tie-breaking network circuits which are connected to receive the physically skewed signals from the priority network and establish when the CSS unit is to be granted access to the system bus. The tie-breaking network circuits include cycle stealer logic circuits which connect to a low priority request line included within the network circuits for accepting bus cycles as a low priority requester on a round robin basis.

The cycle stealer logic circuits further connect to a high priority request line within the network circuits and in response to high priority request signals refuse acceptance of a bus cycle granted to such CSS unit as a low priority requester. This allows the cycle to be passed on to a next higher priority unit. Since each CSS unit has identical cycle stealer logic circuits, the remaining CSS units do the same which results in the high priority requester being granted the cycle. At the end of the high priority requester bus cycle, the CSS units resume round robin cycling at the point prior to the interruption.

The above arrangement reduces the high priority input/output unit latency time. That is, CSS units can pass on bus cycles to input/output units having lower positional priority on the system bus for executing high priority requests.

It also allows more units to participate in the round robin cycle stealing arrangement. That is, the invention enables the round robin sequencing of a plurality of CSS units to be interrupted momentarily for granting a bus cycle to high priority requesters and then resume round robin sequencing at the same point so as not to disrupt such sequencing. This is particularly important in a system which includes more than two such units.

The novel features which are believed to be characteristic of the invention both as to its organization and method of operation, together with further objects and advantages, will be better understood from the description in the following section when considered in connection with the accompanying drawings described in this section. It is to be expressly understood, however, that each of the drawings is given for the purpose of illustration only and is not intended as a definition of the limits of the present invention.

DETAILED DESCRIPTION OF THE PREFERRED EMBODIMENT

Overall System

Figure 1:
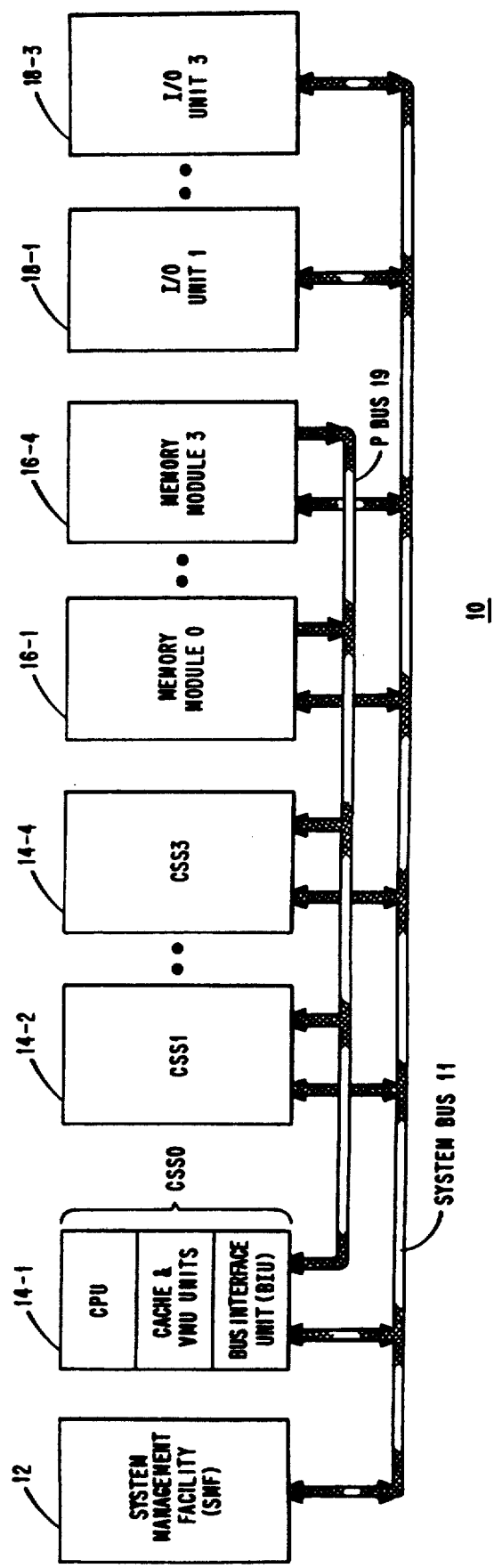
FIG. 1 is a block diagram of a multiprocessor system which incorporates the principles of the present invention.

FIG. 1 shows in block diagram form, a multiprocessor system 10 which incorporates the method and apparatus of the present invention. As shown, system 10 includes a system management facility (SMF) 12, a plurality of identical central subsystem (CSS) units 14-1 through 14-4, and a number of different subsystems 16 through 18 which are tightly coupled together by a system bus 11. The illustrative different subsystems include a number of memory subsystems 16-1 through 16-4 and a number of input/output subsystems 18-1 through 18-3. Additionally, the CSS units 14-1 through 14-4 and memory subsystems 16-1 through 16-4 connect in common to a unidirectional asynchronous processor (P) bus 19. Each subsystem includes an interface unit (BIU) which enables the subsystem to transmit or receive requests in the form of commands, interrupts, data or responses/status to another subsystem on the system bus 11 in an asynchronous manner.

At the left end of bus 11, a termination network not shown defines the high priority end of bus 11. The SMF unit 12 which is positioned to the right of the termination network has the highest priority. Bus priority decreases as a function of each subsystem's distance from the termination network. The different subsystems communicate requests over system bus 11 on a priority basis defined by a distributed priority network included within system bus 11. For more detailed information regarding this arrangement, reference may be made to U.S. Pat. No. 4,724,519.

Figure 2:
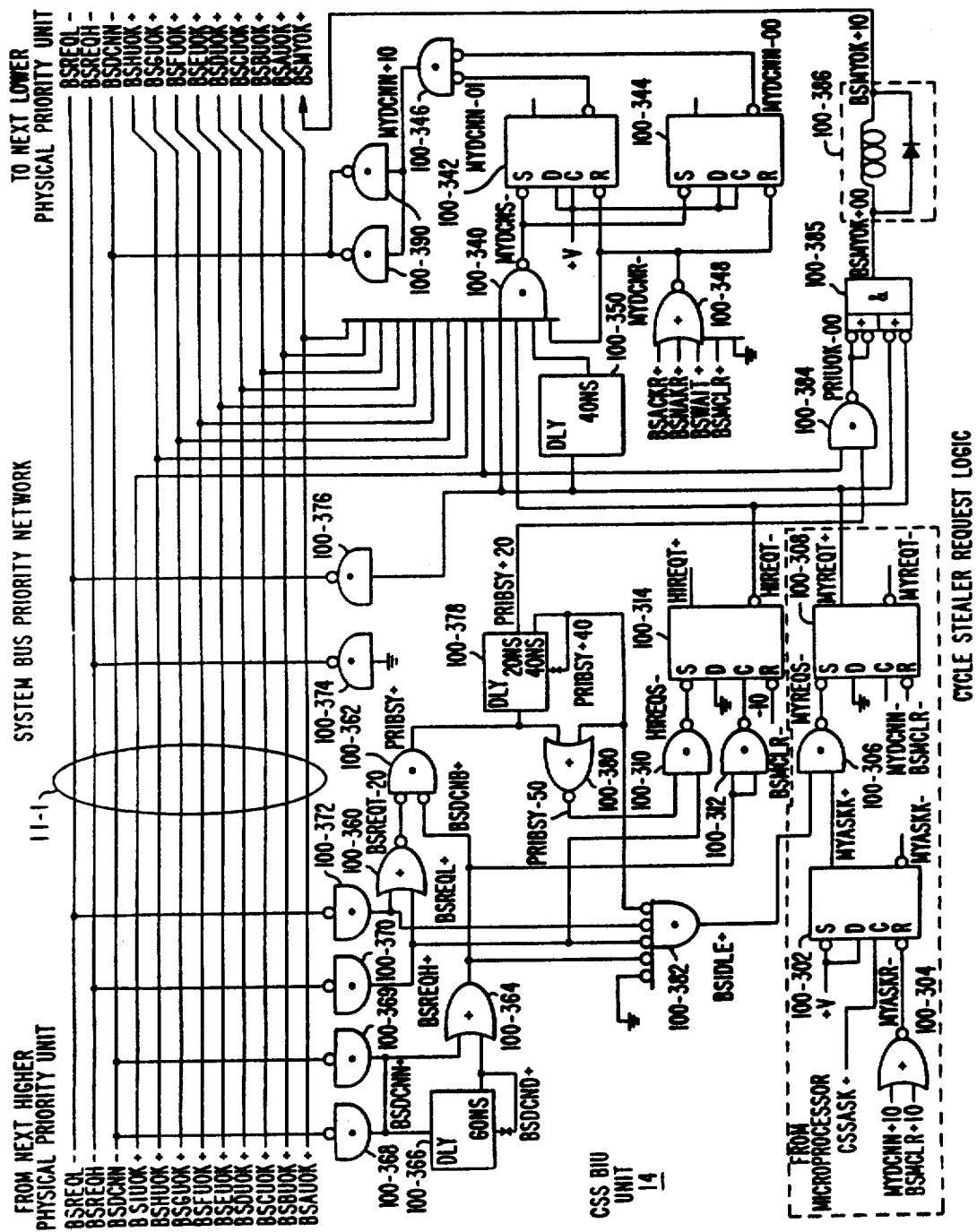
FIG. 2 shows in greater detail, the bus request logic circuits included in the interface circuits of FIG. 1.

Bus Request Logic Circuits—FIG. 2

FIG. 2 shows in greater detail, the bus request logic circuits of block 100-300 which form part of the circuits of the bus interface unit (BIU) of each of the CSS units 14-1 through 14-3. These circuits connect to the system bus priority network 11-1. As seen from FIG. 2, the circuits 100-300 include a user ASK flip-flop 100-302 which connects in series to a my request flip-flop 100-308 and associated NOR and NAND gates 100-304 and 100-306 as shown. The user ASK flip-flop 100-302 is set to a binary ONE state in response to a user ASK signal generated by the CSS microprocessing unit. It is reset to a binary ZERO when signal MYASKR- is forced to a binary ZERO upon the granting of a CSS request (MYDCNN+10=1) or in response to a bus clear signal (BSMCLR+10=1). These signals are applied via a NOR gate 100-304.

The CSS bus request circuits 100-300 do not request a bus cycle unless no other subsystems are making requests. Once a CSS unit decides to make a bus request, it is made at a low priority and the request continues to be made until a bus cycle is granted.

As shown, the bus request circuits 100-300 further include priority network input circuits corresponding to circuits 100-360 through 100-390 which form part of the distributed positional priority network 11-1 of system bus 11. These circuits connect to both the low priority and high priority bus lines BSREQL and BSREQH via input gates 100-370 and 100-372 to AND gate 100-382. It is only when both signals BSREQL+ and BSREQH+ are binary ZEROS that AND gate 100-382 forces bus idle signal BSIDLE+ to a binary ONE state.

In greater detail, when user flip-flop 100-302 is a binary ONE, and a bus idle signal BSIDLE+ 100-382 is in a binary ONE state, NAND gate 100-306 forces signal MYREQS— to a binary ZERO causing a my request flip-flop 100-308 to switch to a binary ONE. This results in a bus low priority bus signal BSREQL— 100-376 being forced low. Signal MYREQT+ causes the NOR/AND circuits of block 100-385 to force bus my OK signal BSMYOK+ to a binary ZERO in the absence of a high priority request (HIREQT— =0), when a prinet busy signal PRIBSY+20 indicates that the priority network is busy (signal PRIBSY+20=1) and oldest bus OK signal from the higher priority unit is a binary ONE. The signals BSIUOK+ and PRIBSY+20 are combined in a NAND circuit 100-320 which forces signal PRIUOK-00 to a binary ZERO.

Signal BSMYOK+00 is applied via a diode and inductor filter/slope control circuit included in a driver circuit 100-384. Signal BSMYOK+10 allows the other lower physical priority units to win access to system bus 11. That is, signal BSMYOK+10 is applied to line BSMYOK+ of nine skewed lower priority network lines of network 11-1 to indicate to the next lower physical priority unit and succeeding lower priority units that there is no higher priority unit which is requesting use of the next bus cycle, thereby allowing all such lower priority units to use the next bus cycle. That is, signal BSMYOK+ is one of the priority signals which are applied as an input to the grant flip-flop of each lower priority unit.

As shown, my request signal MYREQT+ is applied as one input to an input NAND gate 100-340 of a grant flip-flop constructed from a pair of flip-flops 100-342 and 100-344. This gate receives the nine prinet signals BSAUOK+ through BSIUOK+ which are combined with signals HIREQT— and MYREQT+. The negation output signals MYDCNN-01 and MYDCNN-00 are applied to inverting inputs of an AND gate 100-346 which generates my data cycle now signal MYDCNN+10.

The negation outputs of flip-flops 100-342 and 100-344 are used to avoid spikes or signal glitches. Also, the clock (c) and data (d) inputs of both flip-flops are tied to a logic ONE voltage to reduce spikes or signal glitches. Both flip-flops are reset to binary ZEROS when reset signal MYDCNR— is forced to a binary ZERO. Signal MYDCNR— when a binary ZERO inhibits the grant flip-flops from being set. Signal MYDCNR— is forced to a binary ZERO via a NOR gate 100-348 when bus master clear signal BSMCLR+, or bus wait signal BSWAIT+, or bus acknowledge signal BSACKR or bus negative acknowledge signal BSNAKR+ is forced to a binary ONE.

In accordance with the present invention, the cycle stealer bus circuits 100-300 further include a high priority request flip-flop 100-309 with associated input NAND gates 100-310 and 100-312. This flip-flop forces a CSS unit to reject acceptance of a bus cycle whenever a high priority request is present on system bus 11 (i.e., signal BSREQH+ =1). The timing for setting this flip-flop is provided by signal PRIBSY-50 which is similar to the timing established by signal PRIBSY+40 for setting my request flip-flop 100-308 when the bus is idle. The HIREQT flip-flop 100-309 can only be set during the first 45 nanoseconds of a bus priority resolution cycle as established by delay circuit 100-378.

The HIREQT flip-flop 100-309 is set in response to a high priority request when signal PRIBSY-50 is a binary ONE. When a binary ONE, signal HIREQT— is forced to a binary ZERO which causes gate 100-385 to generate the output prinet grant signal BSMYOK+00 enabling a next lower unit to accept the next bus cycle. Additionally, signal HIREQT— also inhibits NAND gate 100-340 from setting grant flip-flops 100-342 and 100-344 and accepting the bus cycle.

Since each CSS unit contains the same identical bus request logic circuits, the prinet grant signal will be passed through each successive CSS subsystem thereby allowing the requesting high priority unit to utilize the bus cycle. The HIREQT flip-flop 100-309 is reset 60 nanoseconds after the trailing edge of bus data cycle, now signal BSDCNN, in addition to bus master clear signal BSMCLR—.

DESCRIPTION OF OPERATION

Figure 3A:
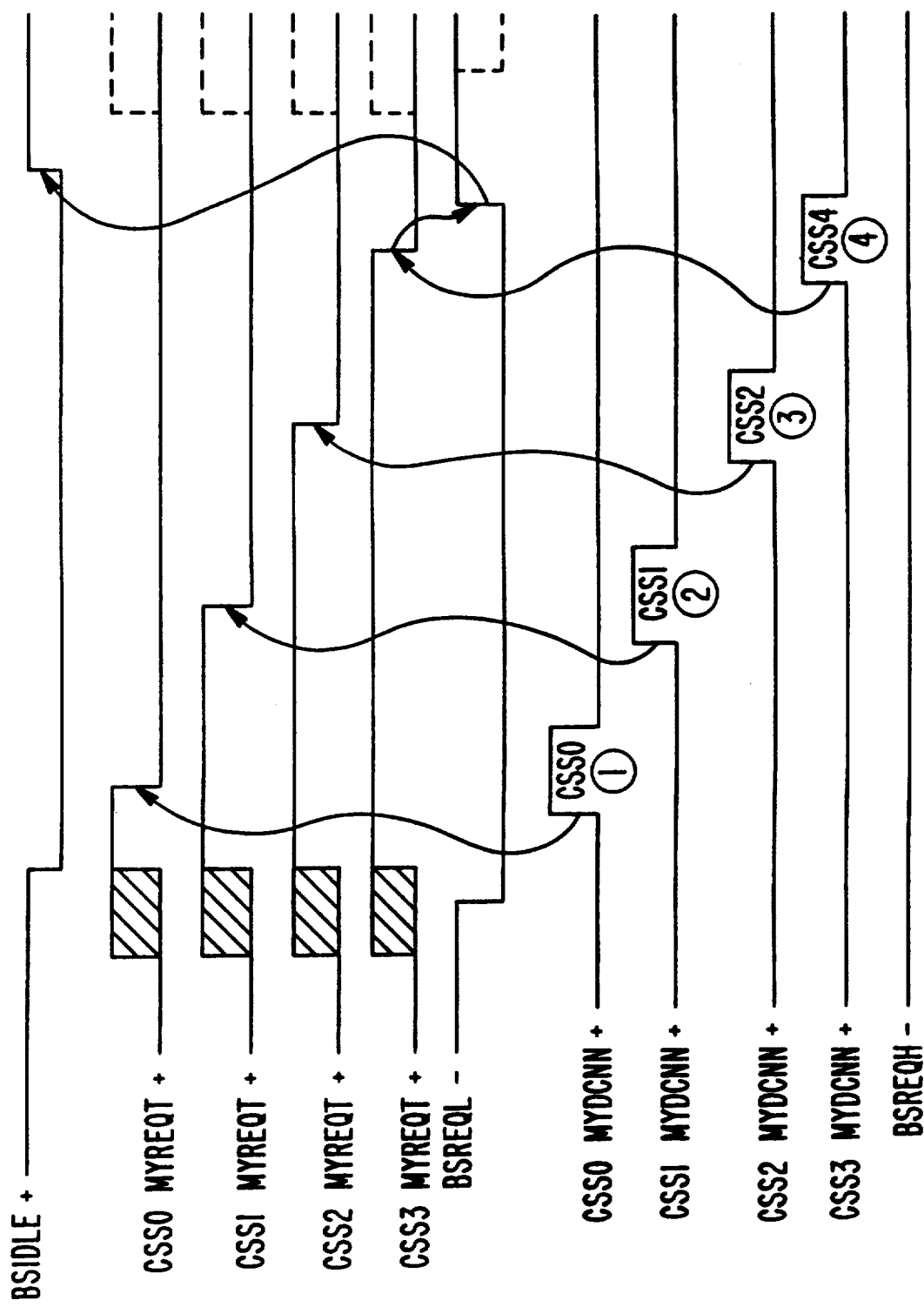
FIGS. 3a and 3b are timing diagrams used to describe the operation of the present invention.

With reference to the timing diagrams of FIGS. 3a and 3b, the operation of the CSS units of the multiprocessor system 10 of FIG. 1 will now be described. FIG. 3a illustrates the normal round robin sequencing of CSS units 14-1 through 14-4 (CSS0 through CSS3) of multiprocessor system 10 in FIG. 1.

As shown in FIG. 2, each system bus cycle has three identifiable intervals. The first interval is the period of time required to determine the highest priority unit which is to be granted the bus cycle. This interval corresponds to the priority network resolution cycle which starts at the negative going edge of a bus request signal BSREQT-20 when one of the CSS units generates a request by setting its my request flip-flop 100-308 of FIG. 2. This causes low priority request signal BSREQL— to be applied via NAND gate 100-376 forcing signal BSREQL— low.

The first interval ends following the amount of asynchronous delay allowed within the system for priority to settle and for the selection of the high priority unit requesting use of system bus 11.

The next interval is the period during which the master unit calls the slave unit. This interval starts at the negative going edge of bus data cycle now signal BSDCNN—. The transition indicates that the use of system bus 11 has been granted to a master unit. Signal PRIBSY+40 prevents a new data cycle until 40 nanoseconds into a priority resolution cycle. This establishes a minimum interval of approximately 50 nanoseconds between requesting the system bus and being granted the bus.

The last interval is the period of time allocated for the response of the slave or receiving unit. This interval begins at the positive going edge of a strobe signal BSDCNB+ of FIG. 2. Signal MYDCNN+10, applied to the system bus 11, results in bus data cycle, now signal BSDCNN— being forced to a binary ZERO signalling the end of the system bus priority resolution cycle. This forces bus signal BSDCNN+ to a binary ONE. After a delay of 60 nanoseconds by a delay circuit 100-366, an OR gate 100-364 forces signal BSDCNB+ to a binary ONE which clears the priority circuits for the next system bus resolution cycle.

As shown in FIG. 3a, it is assumed the bus 11 is in an idle state (i.e., signal BSIDLE+ is a binary ONE and that each of the CSS units 14-1 through 14-4 makes a bus request (i.e., sets its my request flip-flop 100-308) at approximately the same time. This results in the generation of the group of my request MYREQT+ signals (CSS0–CSS3) shown in FIG. 3a.

Because of the positional priority arrangement of CSS units on system bus 11, the priority network circuits grant bus cycles to the CSS units in the order of their physical positioning relative to the high priority end of the bus. Therefore, CSS0 through CSS3 are in turn granted bus cycles establishing the round robin sequencing. At the end of each cycle, the bus slave generates an acknowledgement signal BSACKR+ which results in the resetting of the grant flip-flops 100-342 and 100-344 which forces MYDCNN+10 to a binary ZERO. Signals MYDCNN+10 and MYDCNN— reset the CSS MYASK and MYREQT flip-flops 100-302 and 100-308.

The signal MYDCNN+10 produces signal BSDCNN— which is received by all CSS units. After being delayed by 60 nanoseconds, this produces signal BSDCNB which forces signal PRIBSY+ to the appropriate state for clearing out the priority network input circuits for enabling initiation of the next priority resolution cycle. That is, signal PRIBSY+20 enables circuits 100-384 and 100-385 of the next highest priority CSS unit (CSS1) to generate prinet grant signal BSMYOK+00 equal to a binary ZERO preventing any lower priority CSS unit from being granted the next bus cycle. Also, signal MYREQT+ causes the CSS1 unit's grant flips 100-342 and 100-344 to be switched to binary ONES. The second bus cycle (bus cycle CSS1) is then carried out as previously described.

Thus, each CSS unit in turn is granted a bus cycle in round robin fashion as indicated in FIG. 3a. It will be noted that if a higher priority CSS unit, such as CSS0, again requests another bus cycle, it will be unable to set its my request flip-flop 100-308 until the system bus returns to an idle state (i.e., signal BSIDLE+ =1). At the end of the CSS3 bus cycle, bus idle signal BSIDLE+ returns to a binary ONE state. At that time, the CSS units can request another bus cycle.

As seen from FIG. 3a, if a high priority unit should require a bus cycles, it heretofore had to wait until all of the CSS units completed their bus cycle of operation. This could require a substantial number of cycles to be performed before bus access could be gained. In the present example, it could require up to four cycles.

The inclusion of the high priority request circuits in the cycle stealer bus request logic circuits according to the present invention eliminates such delays without disturbing the normal round robin sequencing. This operation is illustrated in FIG. 3b. Again, it is assumed that all four CSS units simultaneously request a bus cycle. However, after the first bus cycle, a high priority requester, such as a fast memory subsystem unit (MEMO) makes a high priority request which results in the setting of its my request flip-flop forcing signal MYREQT+ to a binary ONE. This results in signal BSREQH— being forced low. For ease of explanation, it can be assumed that this would be carried out by having the output signal MYREQT+ drive NAND gate 100-374 since the unit is a high priority unit. For further information regarding such circuits, reference may be made to the related copending patent application entitled, "Flexible Distributed Priority Network."

As seen from FIG. 2, the signal BSREQH+ causes the setting of high priority request flip-flop 100-309. This forces signal HIREQT— to a binary ZERO forcing grant signal BSMYOK+ to be forced to a binary ONE passing it along the next highest priority unit. At the same time, signal HIREQT— inhibits the setting of the cycle stealer grant flip-flops 100-340 and 100-342. Since the remaining CSS units will also have set their high priority request flip-flops, this results in the grant signal being passed onto the memory subsystem unit. This results in the memory subsystem being granted the second bus cycle as indicated by signal MEMO MYDCNN+.

Upon the completion of the next bus cycle, signal MYDCNN+ is reset which results in the resetting of signal BSDCNN+. This signal will result in the resetting of the high priority request flip-flops 100-309 within all of the CSS units. At that time, the bus cycle stealer grant circuits will be again permitted to continue round robin sequencing. As shown in FIG. 3b, CSS1 is granted the third bus cycle. However, prior to the fourth cycle, the memory subsystem unit again sets its my request flip-flop which forces MYREQT+ to a binary ONE. This in turn forces signal BSREQH— low resulting in the switching of the high priority flip-flop 100-309 within each CSS unit. This causes the grant signal to be passed onto the memory subsystem unit. This results in the memory subsystem being granted the fourth bus cycle after the CSS1 bus cycle. At the completion of the bus cycle, again round robin sequencing is resumed.

Figure 3B:
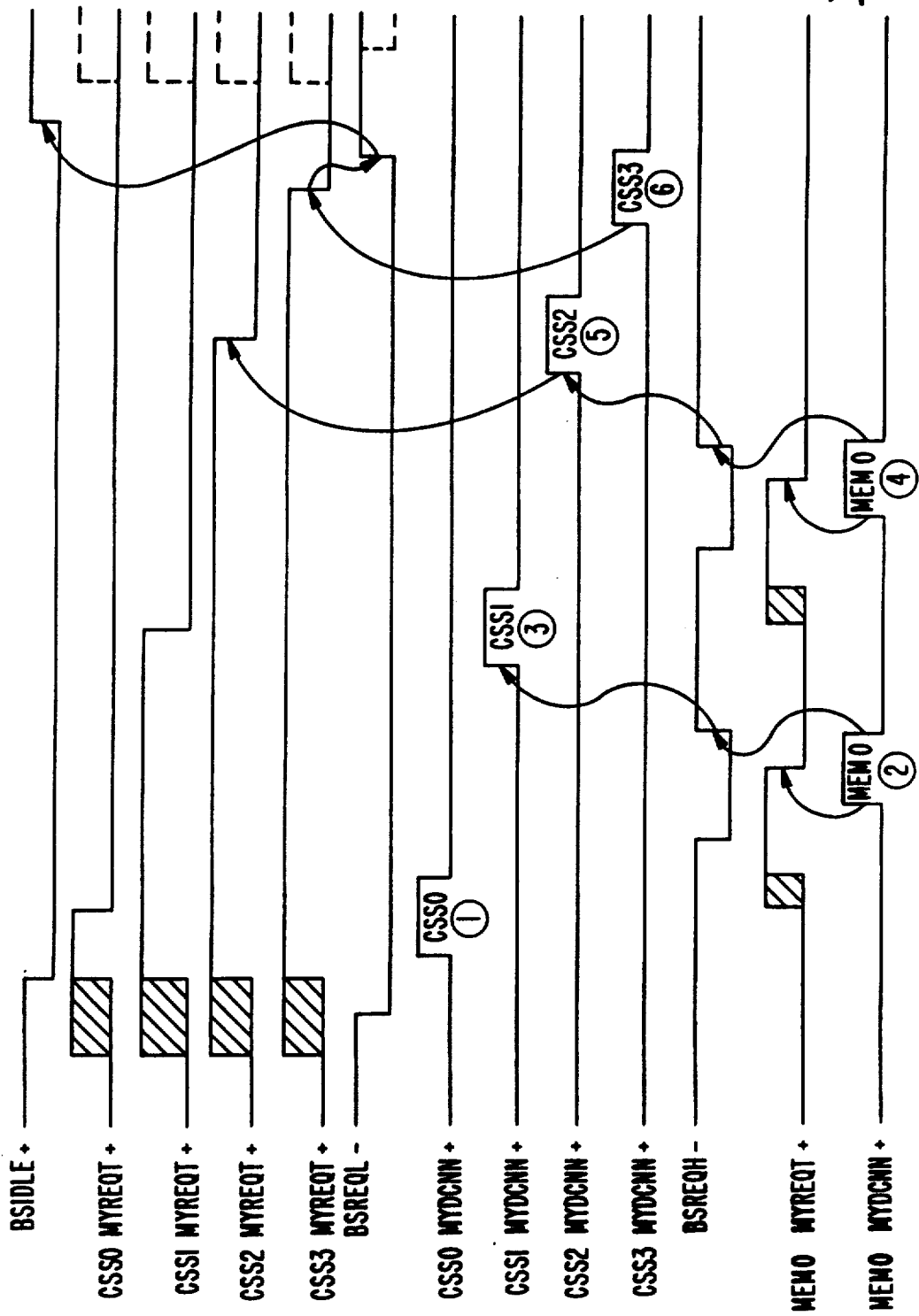

More specifically, as seen from FIG. 3b, each of the CSS2 and CSS3 system units is in turn granted a bus cycle. At the completion of the CSS3 bus cycle, the resetting of the CSS3 my request flip-flop forces low priority request signal BSREQL— to a binary ONE. This results in bus idle signal BBIDLE+ being forced to a binary ONE state signalling the completion of the round robin sequencing. At that time, the CSS units are able to generate a next request.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A method of operating a multiprocessor system for controlling round robin bus cycle grant sequencing, said system including a plurality of central subsystem (CSS) units and a plurality of input/output units coupled to different physical positions along a system bus, said units asynchronously transferring requests along said system bus between different ones of said units in accordance with positional priority signals indicative of a positional priority of each unit along said system bus and controlled by a plurality of network bus interface section each included in a respective one of said units, said method comprising the steps of:

(a) detecting by input circuits included in each CSS unit whether a high priority request or a low priority request has placed said system bus in a busy state;

(b) generating an output idle signal by a detector circuit included in each CSS unit for indicating whether said system bus is in an idle state;

(c) applying by each CSS unit a low priority request to said system bus when said system bus is not in the busy state and when said output idle signal indicates said system bus is in the idle state;

(d) granting a bus cycle to each requesting CSS unit in accordance with said positional priority signals;

(e) refusing by one of said requesting CSS units acceptance of a bus cycle granted to said one requesting CSS unit upon detecting a high priority request;

(f) altering said positional priority signals for signalling refusal of the refused bus cycle to the units having a positional priority lower than that of said refusing CSS unit; and (g) granting the refused bus cycle to one of said lower positional priority units which generated the high priority request.

2. The method of claim 1, further including the steps of:

(h) signalling completion of the refused bus cycle to all of said units; and (i) enabling each requesting CSS unit to accept a next bus cycle granted in accordance with said positional priority signals for continuing round robin bus cycle grant sequencing from a point in time prior to the detection of the high priority request.

3. A multiprocessor system comprising a plurality of central subsystem (CSS) units and a plurality of input/output (I/O) units coupled to different physical positions along a system bus, said CSS unit each coupled by a respective network bus interface section near one end of said system bus at positions of higher positional priority, said I/O units each coupled by a respective network bus interface section further from the one end of said system bus at positions of positional priority lower than that of said CSS units, said units asynchronously transferring requests between different ones of said units in accordance with positional priority signals indicative of the positional priority of each unit and controller by each network bus interface section of said units, said multiprocessor system further including:

(a) CSS bus request circuit means included in each network bus interface section of said CSS units, said CSS bus request circuit means each including:

(i) input circuit means, coupled to said system bus, for detecting when either a high priority request or a low priority request has placed said system bus in a busy state, (ii) detector circuit means, coupled to said input circuit means, for generating an output idle signal when none of said units are applying the high priority request or the low priority request on said system bus to indicate said system bus is in an idle state, (iii) output bus request circuit means, coupled to said detector circuit means and to said system bus, for applying a low priority request to said system bus when said system bus is in the idle state as indicated by said output idle signal and for being granted a bus cycle in accordance with said positional priority signals, and (iv) high priority request circuit means, coupled to said input circuit means and to said output bus request circuit means, for refusing acceptance of a granted bus cycle and for altering said positional priority signals to grant the refused bus cycle to one of said units having a lower positional priority; and (b) I/O bus request circuit means, included in each network bus interface section of said I/O units, for applying a high priority request to said system bus and for accepting the refused bus cycle granted in accordance with said positional priority signals.

4. The multiprocessor system of claim 3, wherein:

said I/O bus request circuit means includes means for signalling completion of the refused bus cycle to all of said units coupled to said system bus; and said input circuit means included means for detecting the completion of the refused bus cycle and for inhibiting said high priority request circuit means such that said output bus request circuit means accepts a next bus cycle granted in accordance with said positional priority signals for continuing round robin bus cycle grant sequencing among said CSS units.

5. The multiprocessor system of claim 4, wherein:

said high priority request circuit means includes storage means, said high priority request circuit means switching said storage means to an active state in response to the detection of a high priority request for refusing acceptance of a granted bus cycle, and said high priority request circuit means switching said storage means from the active state to an inactive state in response to the detection of completion of the refused bus cycle for continuing said round robin bus cycle grant sequencing among said CSS unit.

* * * * *